United States Patent [19]
Felton et al.

[11] Patent Number: 5,752,429
[45] Date of Patent: May 19, 1998

[54] FUEL INJECTION PUMP WITH IMPROVED SHAFT SEAL SYSTEM

[75] Inventors: George Nicholas Felton; Christopher Wood, both of Kent, England

[73] Assignee: Lucas Industries PLC, England

[21] Appl. No.: 800,054

[22] Filed: Feb. 14, 1997

[51] Int. Cl.⁶ ..................................... F01B 31/00
[52] U.S. Cl. .................. 92/86; 123/509; 277/29; 277/59
[58] Field of Search .................. 92/80, 82, 86, 92/72; 123/509; 277/29, 58, 59

[56] References Cited

U.S. PATENT DOCUMENTS

| | | | |
|---|---|---|---|
| 3,514,114 | 5/1970 | Monahan | 92/86 |
| 3,738,666 | 6/1973 | Adams | 277/58 |
| 4,174,672 | 11/1979 | Cox | 277/59 |
| 5,503,367 | 4/1996 | Thompson et al. | 277/29 |

*Primary Examiner*—Thomas E. Denion
*Attorney, Agent, or Firm*—David P. Gordon

[57] ABSTRACT

A fuel injection pump includes a casing; a drive shaft rotatably mounted in the casing and extending from a drive receiving end which is located outside of the casing to a point inside the casing; and first and second spaced apart seals each for preventing the flow of fluid between the casing and the drive shaft at the location of the seal. A chamber is formed between the drive shaft and the casing, the chamber being bounded at opposite ends thereof by the seals, and a vent passage extends from the chamber to a point on the surface of the casing to vent the chamber. The vent passage includes a portion defined by the clearance space between a screw threaded opening and a screw threadedly engaged with the opening. The screw is preferably a screw which secures the casing to the engine supplied by the pump. The vent prevents fuel escaping, in the event of seal failure, from the interior of an injection pump to the interior of an engine with which the injection pump is associated but does not require any additional components.

5 Claims, 2 Drawing Sheets

5,752,429

FUEL INJECTION PUMP WITH IMPROVED SHAFT SEAL SYSTEM

BACKGROUND OF THE INVENTION

Field of the Invention

This invention relates to a fuel injection pump having an improved shaft seal system, and in the preferred embodiment provides a fuel injection pump which substantially eliminates the danger of fuel escaping from the interior of the injection pump to the interior of the timing case of the engine with which the injection pump is associated.

State of the Art

A fuel injection pump typically comprises a casing and a drive shaft rotatably mounted within the casing. The drive shaft extends from a drive receiving end thereof located outside of the casing, through an aperture provided in the casing, to the interior of the casing to drive the internal components of the injection pump. As will be appreciated by those skilled in the art, the interior of the casing of a typical fuel injection pump is flooded with fuel. Typically, the injection pump is secured to the engine block or timing case of the engine with which it is associated so that the drive receiving end of the drive shaft is located within the timing case to receive drive from an appropriate internal component of the engine. Under these circumstances, it will be appreciated that any leakage of fuel from the interior of the casing along the line of the drive shaft is highly undesirable since such leakage will result in fuel entering the timing case of the engine. Such fuel leakage may adversely affect the properties of the engine lubricating oil and, in the extreme case, could lead to engine runaway if the timing case is vented into the engine air intake system.

SUMMARY OF THE INVENTION

According to one aspect of the present invention there is provided a fuel injection pump comprising a casing; a drive shaft rotatably mounted in the casing and extending from a drive receiving end which is located outside of the casing to a point inside the casing; first and second spaced apart seals each for preventing the flow of fluid between the casing and the drive shaft at the location of the seal; a chamber formed between the drive shaft and the casing, the chamber being bound at opposite ends thereof by the seals; and a vent passage extending from the chamber to a point on the surface of the casing to vent the chamber, wherein the vent passage includes a portion defined by clearance space between a screw threaded opening and a screw threadedly engaged with the opening.

The provision of the vent passage from the chamber means that any fuel which passes the inner of the seals and enters the chamber will be vented to the exterior of the casing rather than passing to the interior of the timing case of the engine. The vent passage also ensures that the pressure within the chamber remains substantially at ambient pressure and accordingly prevents super-ambient or sub-ambient pressures from being developed within the chamber as a result of thermal expansion or contraction of fluid contained within the chamber.

Preferably, part of the vent passage is defined by the clearance space which is present between a screw-threaded fastening and a screw-threaded hole provided in the casing. In this connection, it will be appreciated that when a parallel threaded screw is screwed into a parallel threaded tapping the joint between the screw and the tapping is not fluid tight even if the screw is tightened. Accordingly, by providing a bore in the casing which extends from the chamber to intersect a tapped hole intermediate the ends of the hole a vent passage is, in use, formed which comprises the bore and a helical portion defined between the threads of the tapped hole and a screw threaded member which is located within the tapped hole. The helical portion prevents the ingress of contaminants to the chamber. Accordingly, a vent passage which is substantially immune from the ingress of contaminants is formed without using any additional components.

Conveniently, the screw which provides the helical portion of the passage is one of the screws used to secure the fuel injection pump to the timing case of the engine with which it is associated.

The above and further features and advantages of the invention will become clear from the following description of a preferred embodiment thereof, given by way of example only, reference being had to the accompanying drawings.

Figure 1:
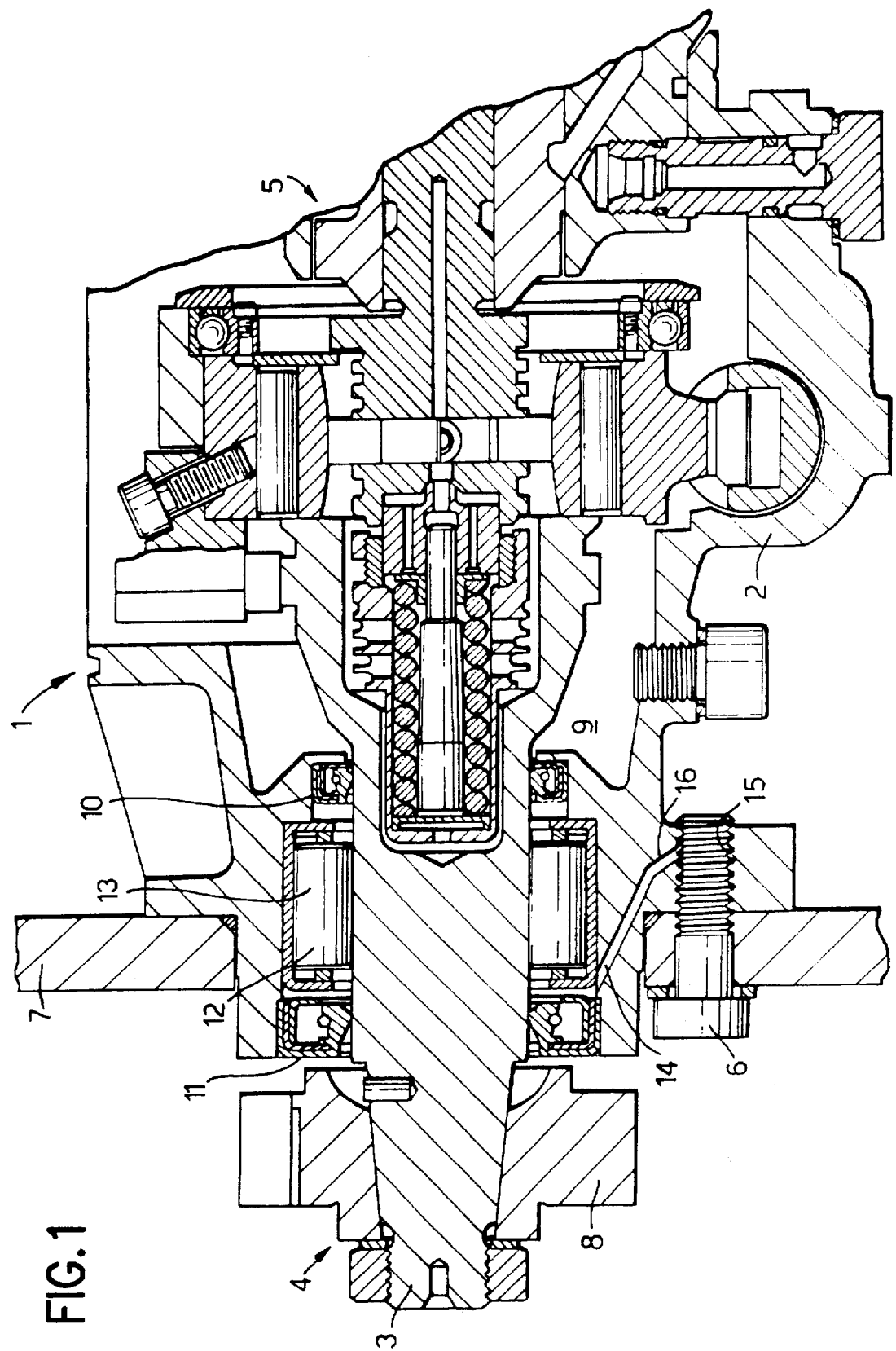
FIG. 1 illustrates schematically in transverse cross section a portion of a fuel injection pump according to a first embodiment of the invention secured to the timing case of an internal combustion engine.

Referring to the FIG. 1, the fuel injection pump 1 comprises a casing 2 and a drive shaft 3. The drive shaft extends from a drive receiving end 4 thereof located outside of the casing 2 to the interior of the casing 2 where it drives the internal components 5 of the fuel injection pump in substantially known manner. The internal components may, for example, be as described in EP-A-0640760, which is hereby incorporated by reference herein in its entirety.

The fuel injection pump is shown in its use position secured by screws 6 to the timing case 7 of an internal combustion engine. The drive receiving end 4 of the drive shaft 3 is located within the timing case 7 and is provided with a pinion 8 for receiving rotary drive from an appropriate drive member within the engine, for example a mating pinion on the camshaft of the engine.

As will be appreciated by those skilled in the art the interior 9 of the casing 2 is flooded with fuel. The pressure of the fuel within the casing will, typically, be above atmospheric pressure. In the absence of the invention, any fuel which escapes from the interior 9 of the casing 2 along the exterior of the shaft 3 would enter the interior of the timing case of the engine.

In accordance with the present invention a first, inner, seal 10 sealing engages the casing 2 and the drive shaft 3 adjacent the interior 9 of the casing 2. A second, outer, seal 11 sealing engages the casing 2 and the drive shaft 3 adjacent the pinion 8. A chamber 12 is accordingly defined between the casing 2 and the drive shaft 3, the chamber being bounded at one end by the inner seal 10 and at the other end by the outer seal 11. In the illustrated embodiment of the invention the chamber is used to house a bearing 13 for rotatably supporting the shaft 3 within the casing 2.

A bore 14 extends from the chamber 12 to intersect a tapped hole 15 provided in the casing 2. The hole 15 is, in fact, one of the threaded mounting holes provided on the casing, each of which, in use, receives a fixing screw 6. A clearance passage is, in use, defined between the threads of the screw 6 and the threads of the hole 15, and this clearance passage connects the bore 14 to the exterior of the casing 2 to provide a vent passage 16 for venting the chamber 12. Any fuel from the interior 9 of the casing 2 which passes the inner seal 10 will accumulate within the chamber 12 and will be vented to the exterior via the vent passage 16. Accordingly, such fuel will not pass the seal 11 to enter the interior of the timing case 7.

The portion of the vent passage 16 defined between the hole 15 and the screw 16 will be in the form of a narrow helical passage. This passage will permit weeping of fuel accumulating within the chamber 12 but will substantially prevent the ingress of contaminants into the chamber 12. Presence of fuel in the vicinity of the hole 15 will act as a tell-tale that fuel is passing in the inner seal 10.

Figure 2:
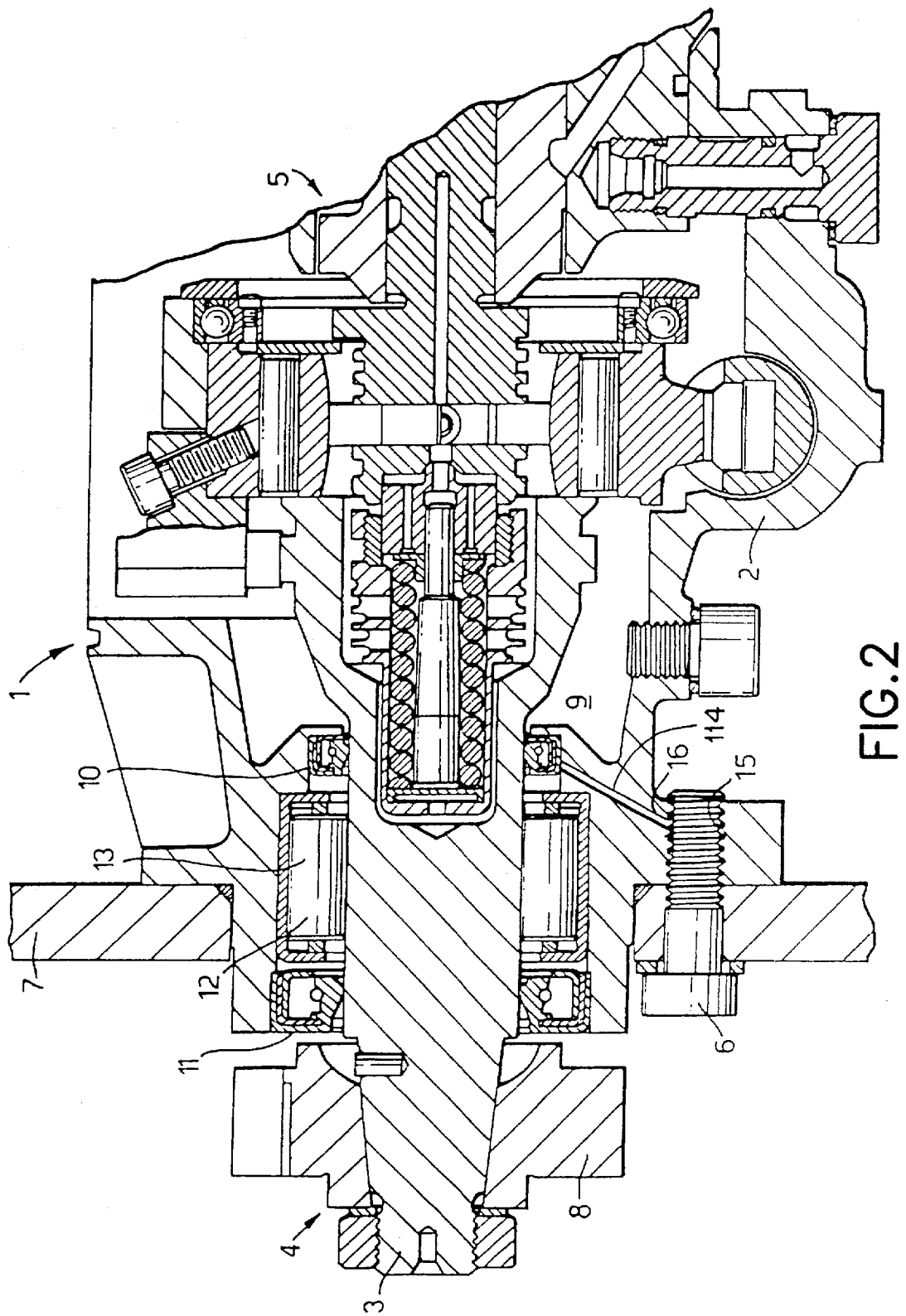
FIG. 2 illustrates schematically in transverse cross section a portion of a fuel injection pump according to a second embodiment of the invention secured to the timing case of an internal combustion engine.

The bore 14 in the illustrated embodiment of the invention extends from adjacent the outer seal 11 to the intersection with the tapped hole 15. Referring to FIG. 2, it will be appreciated, however, that the bore 114 may extend from any convenient point in the chamber 12, and in particular may extend from a point adjacent the inner seal 10. Such an arrangement may, indeed, be desirable since it will prevent or reduce the extent to which lubricant is washed from the bearing 13 by any fuel passing the inner seal 10.

We claim:

1. A fuel injection pump comprising a casing; a drive shaft rotatably mounted in the casing and extending from a drive receiving end which is located outside of the casing to a point inside the casing; first and second spaced apart seals each for preventing the flow of fluid between the casing and the drive shaft at the location of the seal; a chamber formed between the drive shaft and the casing, the chamber being bound at opposite ends thereof by the seals; and a vent passage extending from the chamber to a point on the surface of the casing to vent the chamber, wherein the vent passage includes a portion defined by a clearance space between a screw threaded opening and a screw threadedly engaged with the opening.

2. A fuel injection pump as claimed in claim 1, wherein the screw threaded opening is formed in the casing.

3. A fuel injection pump as claimed in claim 2, wherein the screw secures the casing to the engine.

4. A fuel injection pump as claimed in claim 1, wherein the clearance space is helical.

5. A fuel injection pump as claimed in claim 1, wherein the first seal is located a greater distance from the drive receiving end than the second seal and the vent passage extends from a point in the chamber adjacent the first seal.

* * * * *